(12) United States Patent
McCormick et al.

(10) Patent No.: US 7,952,078 B2
(45) Date of Patent: May 31, 2011

(54) NEUTRON SENSITIVITY BY INCREASING BORON SURFACE AREA

(75) Inventors: Dan Jay McCormick, Hudson, OH (US); James Michael Lustig, Mantua, OH (US)

(73) Assignee: General Electric Company, Schenectady, NY (US)

( * ) Notice: Subject to any disclaimer, the term of this patent is extended or adjusted under 35 U.S.C. 154(b) by 236 days.

(21) Appl. No.: 12/422,716

(22) Filed: Apr. 13, 2009

(65) Prior Publication Data

US 2010/0258736 A1    Oct. 14, 2010

(51) Int. Cl.
*G01T 3/00* (2006.01)
(52) U.S. Cl. .................................. 250/390.01
(58) Field of Classification Search ............. 250/370.05, 250/390.01, 391
See application file for complete search history.

(56) References Cited

U.S. PATENT DOCUMENTS

| | | | |
|---|---|---|---|
| 6,426,504 | B1 | 7/2002 | Menlove et al. |
| 6,545,281 | B1* | 4/2003 | McGregor et al. ....... 250/370.05 |
| 7,002,159 | B2 | 2/2006 | Lacy |
| 7,164,138 | B2* | 1/2007 | McGregor et al. ....... 250/390.01 |
| 2005/0135535 | A1* | 6/2005 | Wallace ....................... 376/153 |
| 2005/0258372 | A1* | 11/2005 | McGregor et al. ....... 250/390.01 |
| 2006/0255282 | A1* | 11/2006 | Nikolic et al. ........... 250/390.01 |
| 2009/0302231 | A1* | 12/2009 | McGregor et al. ....... 250/390.03 |

OTHER PUBLICATIONS

Bellinger, S.L., W.J. McNeil, D.S. McGregor, 2009 "Improved Fabrication Technique for Microstructured Solid-State Neutron Detectors," S.M.A.R.T. Laboratory, Mechanical and Nuclear Engineering Dept., Kansas State University, Manhattan, KS 66506.

McGregor, M.C., Hammig, M.D., Yang, Y.-H., Gersch, H.K., and Klann, R.T., 2003, "Design Considerations for Thin Film Coated Semiconductor Thermal Neutron Detectors—I: Basics Regarding Alpha Particle Emitting Neutron Reactive Films," Nucler Instruments & Methods in Physics Research A, 500, pp. 272-308.

McNeil, W.J., Bellinger, S.L., Unruh, T.C., Henderson, C.M., Ugorowski, P., et al. 2009, "1-D Array of Perforated Diode Neutron Detectors," Nuclear Instruments and Methods in Physics Research A, 604, pp. 127-129.

Shultis, J.K., and McGregor, D.S., 2009, "Design and Performance Considerations for Perforated Semiconductor Thermal-Neutron Detectors," Nuclear Instruments and Methods in Physics Research A, doi: 10.1016/j.nima.2009.02.033.

Unruh, T.C., Bellinger, S.L., Huddleston, D.E., McNeil, W.J., Patterson, E., et al., 2009, Design and Operation of a 2-D Thin Film Semiconductor Neutron Detector Array for Use as a Beamport Monitor, Nuclear Instrucments and Methods in Physics Research A, 604, pp. 150-153.

\* cited by examiner

*Primary Examiner* — David P Porta
*Assistant Examiner* — Mark R Gaworecki
(74) *Attorney, Agent, or Firm* — Pearne & Gordon LLP

(57) ABSTRACT

A neutron detector including an anode and a cathode. The cathode extends proximate the anode and has a face including boron. The face has varied topography. The varied provides increased surface density.

20 Claims, 3 Drawing Sheets

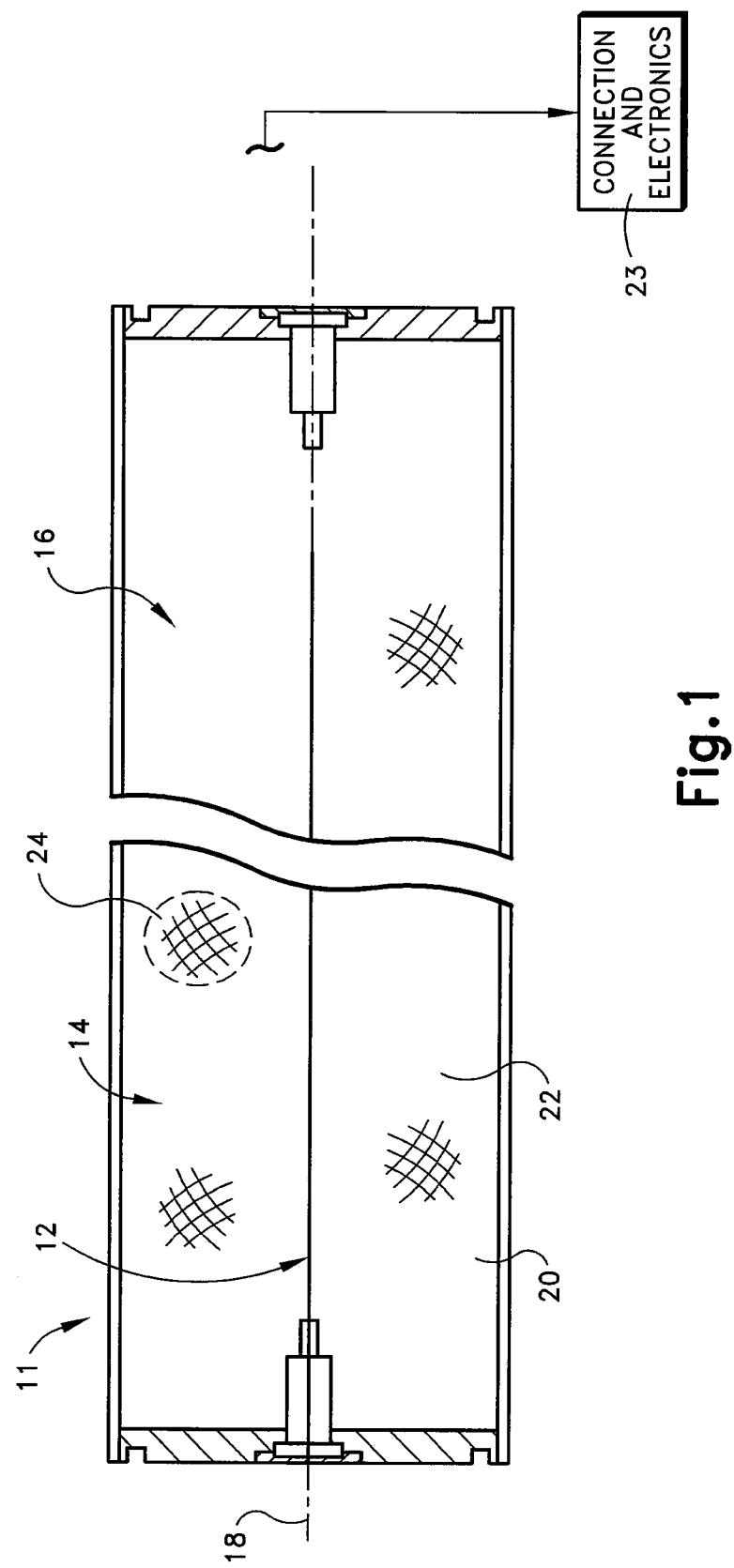

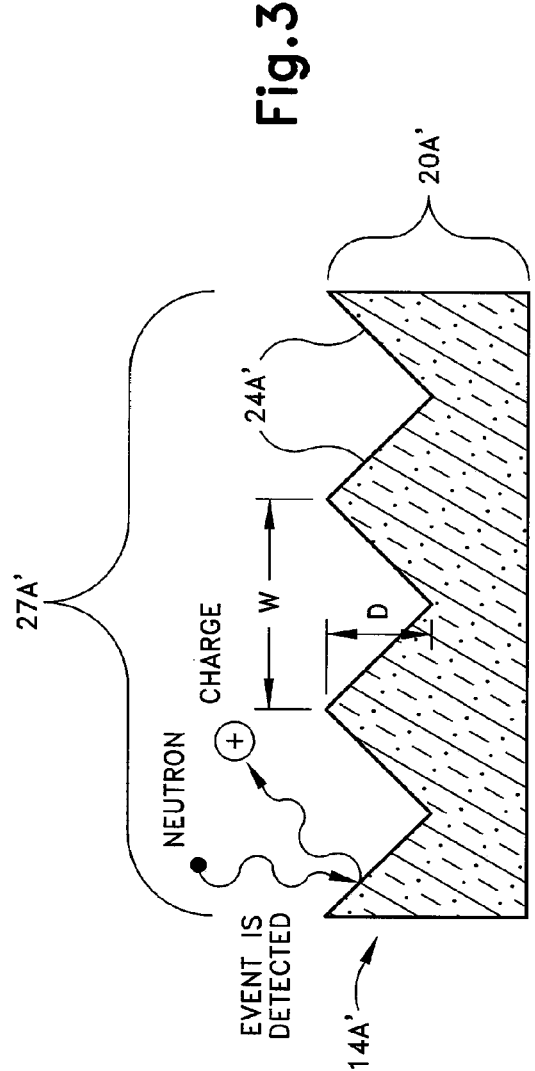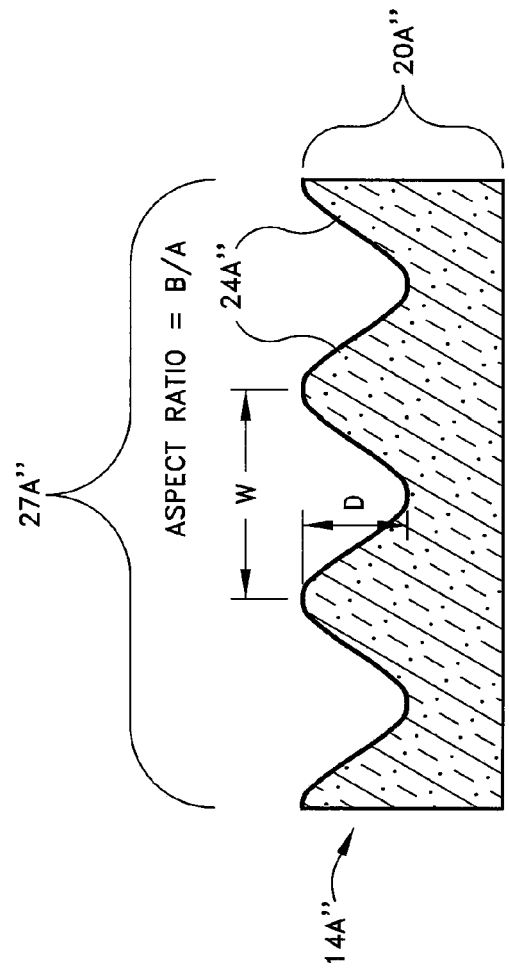

NEUTRON SENSITIVITY BY INCREASING BORON SURFACE AREA

BACKGROUND OF THE INVENTION

1. Field of the Invention

The present invention relates to neutron detectors, and specifically relates to detectors that utilize boron within a cathode.

2. Discussion of Prior Art

Recently, high sensitivity neutron detectors for homeland security has become increasingly important and increasingly in demand. Many known neutron detectors utilize He-3, a neutron sensitive material known to provide a detector of high sensitivity. The He-3 is provided within a volume that includes a cathode within a detection arrangement. Recently, the availability of He-3 has been has become insufficient to satisfy the demand associated with high sensitivity neutron detectors. Other than He-3 there are only a few neutron sensitive materials that are useful for constructing a neutron detector, including certain isotopes of uranium, lithium and boron.

Focusing upon boron, the majority (e.g., approximately 80%) of available boron is B-11, which has 5 protons and 6 neutrons, and the remainder (e.g., approximately 20%) is Boron 10 (B-10), which has 5 protons and 5 neutrons. Only the B-10 isotope is useful for neutron detection. Thus, for use in a neutron detector, it is typically desirable to enrich the concentration of B-10.

As mentioned, the detection of neutrons is based on the generation of secondary radiations. With B-10 ($^{10}$B) as the converter material, the reaction is described as follows when a neutron is captured:

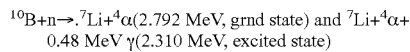

$$^{10}B+n \rightarrow {}^{7}Li+{}^{4}\alpha(2.792 \text{ MeV, grnd state}) \text{ and } {}^{7}Li+{}^{4}\alpha+ \\ 0.48 \text{ MeV } \gamma(2.310 \text{ MeV, excited state})$$

The energy released by the reaction is approximately 2.310 million electron volts (MeV) in 94% of all reactions (2.792 MeV in the remaining 6%), and equals the energy imparted to the two reaction products (the energy of the captured neutron is negligible by comparison). The reaction products, namely an alpha particle ($\alpha$) and a lithium nucleus ($^{7}$Li) are emitted isotropically from the point of neutron capture by B-10 in exactly opposite directions and, in the case of the dominant excited state, with kinetic energies of 1.47 MeV and 0.84 MeV, respectively.

A new generation of neutron detectors would be most beneficial if the new generation provided a similar level of neutron sensitivity and a discrimination of gamma rays without significant change to overall dimensions of the detectors. Another way of considering this idea is that the new generation of detectors must be physically similar to existing detectors so they can be easily retrofitted and must have comparable neutron sensitivity and gamma rejection as He-3.

Turning back to Boron B-10, as mentioned the use of B-10 as being capable of use for neutron detection is known. However, the use of B-10 in known sensor configurations (i.e., plated onto the cathode structure of known sensors) is associated with insufficient sensitivity when compared to a He-3 detector of similar geometry and design. Specifically, the plating on the cathode structure is relatively thin and such detectors achieve only a few percent efficiency, due to the fact that the thicknesses needed for a substantial capture of neutrons exceeds the escape range of the neutron capture reaction products. In one example, the optimal thickness of a B-10 coated detector is 0.4 mg/cm$^2$. So in many instances, capture reaction products cannot escape. Only conversions of neutrons in a very thin layer near the surface of the B-10 adjacent the counting gas are detected efficiently. Since this very thin, top layer of the B-10 coating captures only a very small percentage of the incident neutrons, efficiency of a neutron detector of such simple design is understandably low.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the present invention provides a neutron detector that includes an anode and a cathode. The cathode extends proximate the anode and has a face including boron. The face has varied topography.

Another aspect of the present invention provides a neutron detector that includes an anode and a cathode. The cathode extends proximate the anode and has a face including boron. The face having means for providing increased surface density.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 1 is a schematic cross-section of an example neutron detector in accordance with one aspect of the invention;

FIG. 3 is further enlarged cross-section view of the example cathode surface layer shown in FIG. 2 and shows the example face topography;

FIG. 4 is a view similar to FIG. 3, but shows another example face topography.

DETAILED DESCRIPTION OF THE INVENTION

Figure 5:
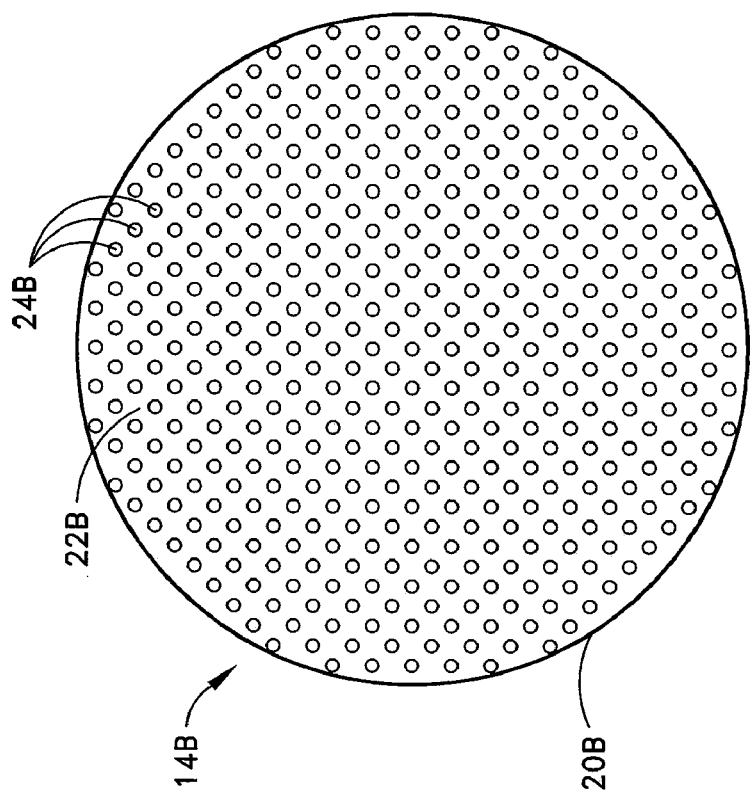
FIG. 5 is a view similar to FIG. 2, but shows yet another face topography.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example embodiment of a neutron detector 11 that includes one aspect of the invention is shown in FIG. 1. Basically, the neutron detector 11 includes a pair of electrodes, which are an anode 12 and a cathode 14. The anode 12 and cathode 14 are separated from each other within a volume 16. In the shown example the cathode 14 provides part of the outer boundary of the volume 16. The volume 16 is sealed and contains a gas, such as argon and carbon-dioxide. The anode 12 is electrically conductive and electrically connected to detection electronics as will be appreciated by the person of skill in the art. In the shown example, the anode 12 is elongate and extends along an axis 18 of the neutron detector 11 and the cathode 14 is cylindrical and extends around the anode 12 and the axis 18. In one example, the anode 12 is a wire that is in the range of 0.0254-0.0508 mm (0.001-0.002 inches) in diameter. As mentioned, such a size range is merely an example. Accordingly, such an example should not be considered to be a limitation upon the invention. The cathode 14 includes a supporting substrate (not shown) and a layer 20 of a neutron sensitive boron material on the substrate. In one specific example, the boron material is enriched to have a high content of B-10. One example of a high content of B-10 is a content of B-10 greater than 90%.

The layer 20 of the cathode 14 has a face 22. In the shown example of the cylindrical cathode 14, the face 22 is directed toward (i.e., exposed to) the anode. The face 22 may be referred to as an interior face of the cathode 14 that includes boron (B-10). Another way of presenting this is that the cathode 14 has a face that includes the boron coated on or otherwise applied to it.

Sensing a neutron is accomplished by a current pulse that occurs between the anode 12 and cathode 14, through the gas, when a neutron impinges upon the B-10 boron of the cathode. When a neutron is absorbed by a B-10 atom in the layer 20 on the cathode 14, an alpha particle (i.e., a helium-4 nucleus) and lithium-7 nucleus—both positively charged—are generated and are ejected in opposite directions along a straight line, the orientation of which is random. One of these particles will not emerge from the B-10 layer because its direction of motion is towards the cathode. The other particle moves towards the gas/coating interface from which it will emerge if it has enough energy. When one of these nuclear particles passes into the gas within the volume 16, they ionize the gas. The negative ion particles, electrons, drift towards the anode 12 and as the negatively charged particles approach sufficiently near the anode (e.g., within 1-3 anode diameters) the negatively charge particles accelerate to the point of generating even more charge. This is called "gas gain" and it generates enough charge so that the resulting current has a perceptible effect within an associated electronics arrangement 23 (shown schematically within FIG. 1) operatively connected to the neutron detector 11. Thus, the current at the anode 12 is detectable and quantifiable. It is to be appreciated that in one example, the associated electronics arrangement 23 includes an electronic amplifier in order to aid in processing the current generated at the anode. It is to be appreciated that general operation/structure of neutron detectors and associated electronics arrangements will be appreciated by the person of skill in the art. Also, it is to be appreciated that structural features of the neutron detector 11, such as size and shape of the components of the neutron detector, are not to be limitations on the invention. For example, the cathode 14 could have a different shape (e.g., other than cylindrical).

Despite the understanding that any dimensional size/shape aspect of the neutron detector, in and of itself, is not a limitation on the invention, it is to be acknowledged that there is often a desire for a neutron detector to be of particular size. In one example, a neutron detector that includes B-10 would be sized the same as a neutron detector that includes He-3. This would allow the neutron detector that includes B-10 within the cathode to be a good physical size replacement for the neutron detector that includes He-3 within the cathode.

In order to provide a minimized desired size of the overall B-10 neutron detector 11 (e.g., generally equal size of a He-3 neutron detector) and yet obtain desired sensitivity (e.g., generally equal sensitivity of a He-3 neutron detector), the invention provides for the face 22 of the B-10 layer 20 of neutron sensitive boron material of the cathode 14 to have a varied topography 24. The varied topography 24 effectively increases the amount of surface area that neutrons can impinge upon. This increased surface area is accomplished without increasing the overall exterior size of the cathode 14 and thus without increasing the overall size of the neutron detector 11.

Focusing upon FIG. 1, the face 22 of the cathode 14 is shown with hatch shading. This hatch shading is to represent the varied topography 24 of the B-10 of the cathode. Note that a portion of the cathode of FIG. 1 is encircled with a dash line.

The varied topography 24 of the face 22 can be of a variety of forms and the invention is intended to cover such variety. For example, the varied topography 24 may include various surfaces texturing/contouring which provide changing/varied relief features. Examples of surface texturing include grooves, ridges, recesses, undulations, pits and pocks. Other examples are possible. In some respects, such varied topography provides recessed/raised portions, angulations, direction changes, orientation changes, unevenness and/or roughness (i.e., non-smoothness) of the surface. Logically there will be a variation of surface height of the face 22. Multiple types of varied topography may even be utilized together. The varied topography 24 provides for increased surface area density, which is a greater amount of surface area onto which neutrons may impinge for a given overall area size (e.g., the size of the encircled area shown in FIG. 1). So accordingly, the varied topography 24 provides means for providing increased surface area density. Such an increased surface area density provides more surface area than the surface area of smooth surfaces and even surfaces that are smoothly curved. Another way of presenting this is that there is a greater amount of surface for the neutrons to impinge upon. Such an increased surface density (i.e., greater amount of surface area) results in a greater amount of neutrons that will impinge upon the surface of the cathode coated with B-10 and successfully result in charge emission from the B-10. With the greater number of neutron impingements/charge emissions, there is a corresponding increase in sensitivity of the detector. This increased sensitivity is in comparison to a B-10 detector of identical outside dimensions without the use of varied face topography of the B-10 on the cathode.

It is to be appreciated that the use of varied topography 24 of the face 22 of the B-10 of the cathode 14 may provide a better result than merely increasing thickness of B-10 applied to the cathode. Specifically, there may be a consideration that neutron detecting sensitivity may be increased by merely increasing the thickness of the B-10 applied to the cathode with the hope that merely a greater amount of B-10 will increase a chance of a charge emission. However, an issue to consider is a neutron reacting with a B-10 atom deep within a thick layer of B-10 and thus there is a risk of self absorption of the created charge in the B-10 layer itself. In such a scenario the created charge could head in the direction out from the B-10 layer and thus toward the gas. However, the possibility that the charge is stopped/absorbed within the B-10 before escaping from the B-10 coating and reaching the gas increases with an increased distance (i.e., thickness) of needed travel within the B-10 before reaching the gas. In other words, the thicker the B-10, the more likely that such arrest/absorption of the created charge will occur. Thus, an increased thickness of B-10 may diminish the sensitivity. As such, one aspect of the invention is based upon the concept of maintaining a thin coating of the B-10 while increasing available surface area (i.e., increased surface density) of the B-10 of the cathode 14. A specific example of average thickness of the B-10 is less than 0.0254 mm (0.001 inch).

Figure 2:
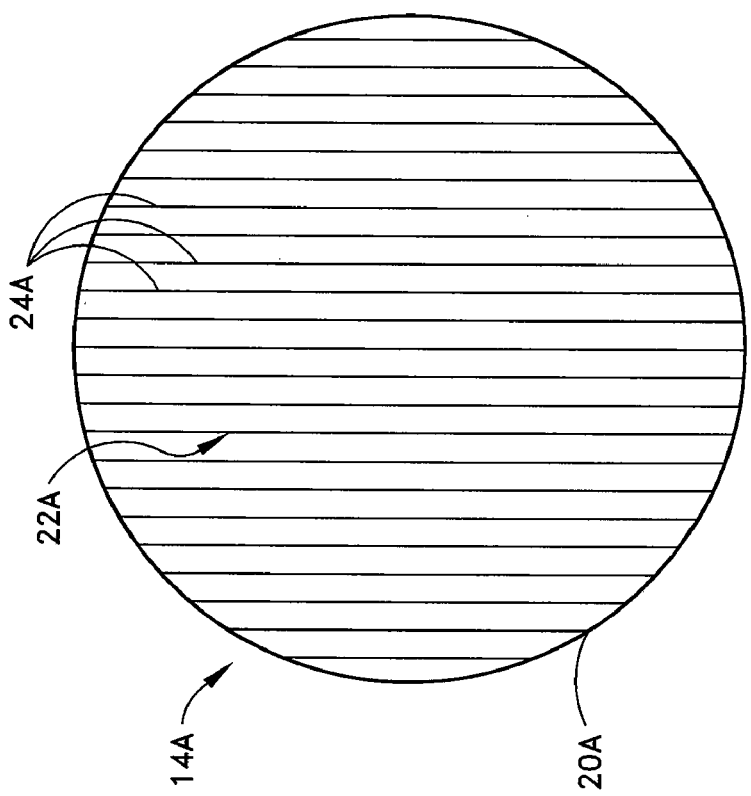
FIG. 2 is an enlarged view of a portion of an example cathode layer of the neutron detector of FIG. 1 with an example face topography.

FIG. 2 is an enlarged example of the encircled portion of FIG. 1. Specifically, FIG. 2 shows a series of parallel grooves as a first general example of a varied topography 24A of the face 22 of the cathode 14. The reference number 24 is used to identify the grooves because the grooves are an example of the varied topography. An "A" is added to the reference numbers used in connection with FIG. 2 to designate the first general example. Also, in the example, the reference number 24A is utilized to point to the different parts of the grooves as being the varied topography. It will be apparent that the grooves could extend in an axial direction substantially parallel to the longitudinal central axis 18 or at an acute angle relative to the longitudinal central axis. The grooves may be formed by any suitable process such as machining, deformation, etching and the like. The grooves themselves may have a variety of sizes and shapes. For example, FIG. 3 is a further enlarged section view looking along the grooves for a first sub-example of the grooves shown in FIG. 2. With FIG. 3 showing a first sub-example, a prime "'" is added to the reference numbers within FIG. 3. In the sub-example of FIG. 3, the grooves providing the varied topography 24A' are V-shaped. The groove surfaces are formed by planes that intersect at vertices. One specific example set of dimensions is approximately 0.0254 mm (0.001 inch) wide (W) and within the range of 0.0762-0.2032 mm (0.003-0.008 inch) deep (D). Of course, width and/or depth of the V-shaped grooves may be varied. As a visual aid to the neutron impingement on the varied topography 24A' and the associated charge emission of the charge, such occurrence is schematically shown in FIG. 3. It is to be appreciated that the reaction is more complex than the simple schematic representation provided within FIG. 3.

As another possible shape of the grooves shown in the general example of FIG. 2 attention is directed to FIG. 4, which is again a section view looking along the grooves. As a second sub-example of the grooves, a double prime "''" is added to the reference numbers within FIG. 4. In the sub-example of FIG. 4, the grooves providing the varied topography 24A" are generally sinusoidal so that the surface undulates. The grooves have depth D and width spacing W to provide for an aspect ratio D/W. Of course, the depth D, width W and aspect ratio D/W may each be varied. It is to be noted that both FIGS. 3 and 4 provide for a good visual aid to understand that the grooves, as example forms of varied topography, provide a greater amount of total surface area (i.e., increased surface density) as compared to the surface area of a plain, flat surface.

As mentioned, the varied topography may be of a variety of forms. As yet another example of a different form of varied topography, attention is directed to FIG. 5 which shows the encircled area from FIG. 1 and in this example having a series of pits/pocks or other depressions. As a second general example, the suffix "B" is added to the reference numbers. In the example, the reference number 24B is utilized to point to the different portions as being the varied topography. The shape of the example pits/pocks is shown generally round/spherical. Of course, the shape may be varied. For example, the periphery may be something other than round. Also, the depth may be elongated to provide some non-spherical shape.

Turning back to the general example of FIG. 1, it is to be appreciated that the varied topography 24 of the face 22 of the B-10 cathode 14 provides for a varying distance from the anode 12. Albeit the variation in distance from the anode 12 is rather small (e.g., a variation of 0.0762-0.2032 mm or 0.003-0.008 inch for the mentioned example of FIG. 3 with V-shaped grooves), the variation of distance from the anode may provide for another way to understand the varied topography 24 of the B-10 cathode 14. Such understanding may be useful for comparison to other detectors having cathodes with smooth surfaces and even surfaces that are smoothly curved.

In one respect, the varied topography on a face can be considered as providing micro-features as compared to with larger scale (i.e., macroscopic) features. One advantage of having a micro-features as compared with macroscopic features is that the feature size is much less than that of the alpha or lithium charged particle path length in the proportional gas, which is on the order of 1 cm. This characteristic means that electric field perturbations can be considered negligible and are not expected to result in additional recombination of charged reactant particles.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. A neutron detector including:
   an anode; and
   a cathode extending proximate the anode and having a face including boron, the face having varied topography, the anode being separated from the cathode by a gas-filled volume.

2. A detector as set forth in claim 1, wherein the boron includes at least 90% B-10.

3. A detector as set forth in claim 1, wherein the cathode extends about the anode and the face is an interior face that faces the anode.

4. A detector as set forth in claim 1, wherein the varied topography includes grooves.

5. A detector as set forth in claim 4, wherein the grooves are V-shaped.

6. A detector as set forth in claim 5, wherein the grooves are approximately 0.0254 mm (0.001 inch) wide and within the range of 0.0762-0.2032 mm (0.003-0.008 inch) deep.

7. A detector as set forth in claim 4, wherein the grooves are sinusoidal.

8. A detector as set forth in claim 1, wherein the varied topography includes depressions.

9. A detector as set forth in claim 8, wherein the depressions are pits in the face.

10. A detector as set forth in claim 1, wherein the boron is provided as a layer on the cathode with an average thickness of less than 0.0254 mm (0.001 inch).

11. A neutron detector including:
    an anode; and
    a cathode extending proximate the anode and having a face including boron, the face having means for providing increased surface density, the anode being separated from the cathode by a gas-filled volume.

12. A detector as set forth in claim 11, wherein the boron includes at least 90% B-10.

13. A detector as set forth in claim 11, wherein the cathode extends about the anode and the face is an interior face that faces the anode.

14. A detector as set forth in claim 11, wherein the means for providing increased surface density includes a varied topography on the face of the anode.

15. A detector as set forth in claim 14, wherein the varied topography includes grooves.

16. A detector as set forth in claim 15, wherein the grooves are V-shaped.

17. A detector as set forth in claim 15, wherein the grooves are sinusoidal.

18. A detector as set forth in claim 14, wherein the varied topography includes depressions.

19. A detector as set forth in claim 18, wherein the depressions are pits in the face.

20. A detector as set forth in claim 11, wherein the boron is provided as a layer on the cathode with an average thickness of less than 0.0254 mm (0.001 inch).

* * * * *